United States Patent
Faruque et al.

(10) Patent No.: US 12,485,841 B2
(45) Date of Patent: Dec. 2, 2025

(54) VEHICLE WITH BUMPER AND CRUSH CANS

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S.M. Iskander Farooq, Novi, MI (US); Saeed D. Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 298 days.

(21) Appl. No.: 18/320,349

(22) Filed: May 19, 2023

(65) Prior Publication Data
US 2024/0383424 A1    Nov. 21, 2024

(51) Int. Cl.
*B60R 19/34*      (2006.01)
*B60R 19/36*      (2006.01)

(52) U.S. Cl.
CPC .............. *B60R 19/34* (2013.01); *B60R 19/36* (2013.01)

(58) Field of Classification Search
CPC ......... B60R 19/24; B60R 19/26; B60R 19/34; B60R 19/36
USPC ................................................ 293/132, 133
See application file for complete search history.

(56) References Cited

U.S. PATENT DOCUMENTS

| | | | |
|---|---|---|---|
| 6,334,639 B1 * | 1/2002 | Vives | B60R 19/18 |
| | | | 293/109 |
| 6,715,593 B1 | 4/2004 | Wu et al. | |
| 7,416,043 B2 * | 8/2008 | Pipkorn | F16F 7/125 |
| | | | 180/274 |
| 7,832,762 B2 | 11/2010 | Breed | |
| 8,746,763 B2 | 6/2014 | Wavde et al. | |

FOREIGN PATENT DOCUMENTS

| | | | | |
|---|---|---|---|---|
| DE | 102011102630 A1 * | 1/2012 | ............. | F16F 7/125 |
| DE | 102014001232 A1 * | 7/2015 | ............. | B60R 19/34 |
| EP | 1864866 A1 | 12/2007 | | |
| WO | WO-2019003922 A1 * | 1/2019 | ............. | B60R 19/24 |

OTHER PUBLICATIONS

Can et al., "Gradually collapsible crash boxes with bonded aluminium tubes", Emerging Materials Research, https://doi.org/10.1680/jemmr.20.00129.

* cited by examiner

*Primary Examiner* — Jason S Daniels
(74) *Attorney, Agent, or Firm* — Frank A. MacKenzie; Brooks Kushman P.C.

(57) ABSTRACT

A vehicle includes a frame and a bumper. The vehicle includes a first crush can attached to the frame. The first crush can is between the frame and the bumper. The first crush can has a first length. The vehicle includes a second crush can attached to the frame. The second crush can is between the frame and the bumper. The second crush can has a second length less than the first length. The vehicle includes a pyrotechnic device supported by the frame, the pyrotechnic device actuatable to detach the first crush can from the frame.

18 Claims, 6 Drawing Sheets

VEHICLE WITH BUMPER AND CRUSH CANS

BACKGROUND

Vehicles include bumpers designed to absorb and/or transfer energy during certain vehicle impacts, such as certain frontal impacts. Impacts may occur with objects of varying size and mass. Vehicle bumpers may have a stiffness determined by the material and structure of the bumper and other components of the vehicle.

DETAILED DESCRIPTION

A vehicle includes a frame. The vehicle includes a bumper. The vehicle includes a first crush can attached to the frame, the first crush can between the frame and the bumper, the first crush can having a first length. The vehicle includes a second crush can attached to the frame, the second crush can between the frame and the bumper, the second crush can having a second length less than the first length. The vehicle includes a pyrotechnic device supported by the frame, the pyrotechnic device actuatable to detach the first crush can from the frame.

The first crush can may be slidable within the second crush can.

The vehicle may include a rod extending forward from the pyrotechnic device, and wherein contact with the rod causes actuation of the pyrotechnic device and detaches the first crush can from the frame.

The first crush can may extend away from the frame to a first end, the second crush can may extend away from the frame to a second end, and the rod may extend away from the pyrotechnic device to a rod end, the rod end between the first end and the pyrotechnic device.

Contact between the first end of the first crush can and the rod end of the rod may cause actuation of the pyrotechnic device to detach the first crush can from the frame.

The first crush can, the second crush can, and the rod may be concentric.

The rod may extend from the pyrotechnic device at least as far as the second end of the second crush can.

Contact between the first crush can and the rod may close an electric circuit and cause actuation of the pyrotechnic device to detach the first crush can from the frame.

The frame may include a rail, and vehicle may include a first support plate within the rail, the first crush can supported by the first support plate.

The vehicle may include a second support plate at an end of the rail, the second crush can supported by the second support plate.

The second support plate may define a hole and the first crush can may extend through the hole.

The pyrotechnic device may include a charge supported by the first support plate, the charge actuatable to fracture the first support plate and detach the first crush can.

The first support plate may define a chamber, the charge in the chamber.

The pyrotechnic device may include a charge actuatable detach the first crush can.

The first crush can may define a first deformation strength, and the second crush can may define a second deformation strength that is different than the first deformation strength.

The first crush can may be attached to the bumper.

The vehicle may include a body, the frame and the body having a unibody construction.

The vehicle may include a body, the body supported by the frame.

With reference to the Figures, wherein like numerals indicate like parts throughout the several views, a vehicle 20 including a frame 22 and a bumper 24 is shown. The vehicle 20 includes a first crush can 26 attached to the frame 22. The first crush can 26 is between the frame 22 and the bumper 24. The first crush can 26 has a first length L1. The vehicle 20 includes a second crush can 28 attached to the frame 22. The second crush can 28 is between the frame 22 and the bumper 24. The second crush can 28 has a second length L2 that is less than the first length L1. The vehicle 20 includes a pyrotechnic device 30 supported by the frame 22. The pyrotechnic device 30 is actuatable to detach the first crush can 26 from the frame 22. Detaching the first crush can 26 from the frame 22 may control kinematics and deformation of the vehicle 20 during certain vehicle impacts, e.g., such that prior to detaching, the first crush can 26 resists movement of the bumper 24 toward the frame 22, and after detaching, the second crush can 28 resists movement of the bumper 24 toward the frame 22 and the first crush can 26 does not.

In the present description, relative vehicular orientations and directions (by way of example, top, bottom, front, rear, forward, rearward, outboard, inboard, inward, outward, lateral, left, right, etc.) is from the perspective of an occupant seated in the vehicle 20 facing forward, e.g., toward a forward instrument panel and/or forward windshield of the vehicle 20. The forward direction of the vehicle 20 is the direction of movement of the vehicle 20 when the vehicle 20 is engaged in forward drive with wheels of the vehicle 20 aligned straight.

Figure 1:
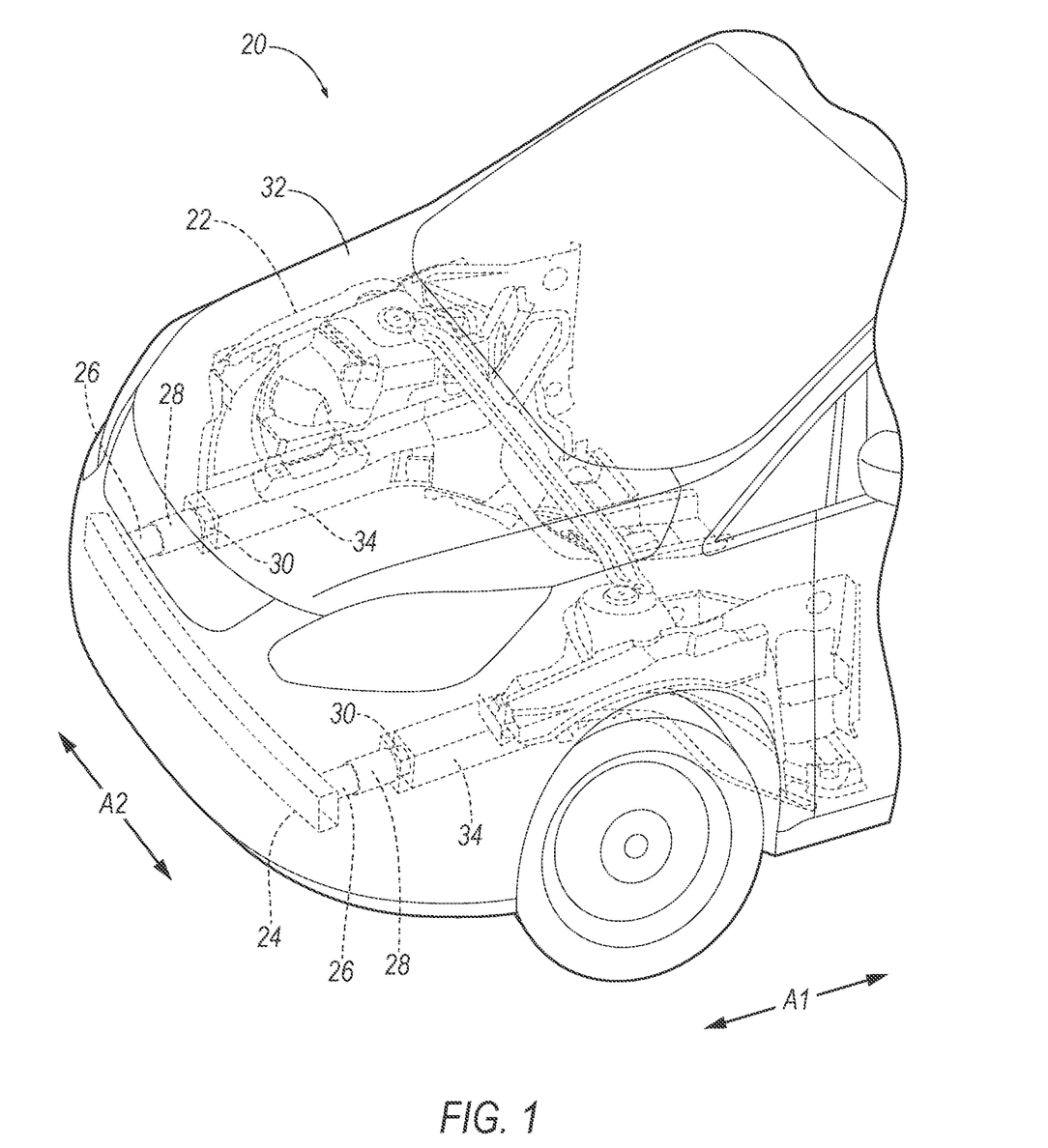
FIG. 1 is a perspective view of a portion of a vehicle with a bumper and first and second crush cans.

With reference to FIG. 1, the vehicle 20 may be any suitable type of automobile, e.g., a passenger or commercial automobile such as a sedan, a coupe, a truck, a sport utility vehicle, a crossover vehicle, a van, a minivan, a taxi, a bus, etc.

The vehicle 20 defines a longitudinal axis A1 which extends between a front and a rear of the vehicle 20. The vehicle 20 defines a lateral axis A2 which extends between a right side and a left side of the vehicle 20. The longitudinal axis A1 and the lateral axis A2 are perpendicular to each other.

The vehicle 20 includes the frame 22 and a body 32. The frame 22 and the body 32 of the vehicle 20 may be of a unibody construction in which the frame 22 is unitary with the body 32. As another example, the body 32 and frame 22 may have a body-on-frame construction (also referred to as a cab-on-frame construction) in which the body 32 and the frame 22 are separate components, i.e., are modular, and the body 32 is supported on and affixed to the frame 22. Alternatively, the frame 22 and the body 32 of the vehicle 20 may have any suitable construction. The frame 22 and the body 32 may be of any suitable material, for example, steel, aluminum, and/or fiber-reinforced plastic, etc. The body 32 may include body panels partially defining an exterior of the vehicle 20. The body panels may present a class-A surface, e.g., a finished surface exposed to view by a customer and free of unaesthetic blemishes and defects.

The frame 22 may include one or more rails 34 that increase rigidity of the vehicle 20 and support other components of the vehicle 20, such as the bumper 24. The rails 34 may be elongated along the longitudinal axis A1. The rails 34 may be spaced from each other along the lateral axis A2, e.g., one rail 34 at the right side of the vehicle 20 and another rail 34 at the left side of the vehicle 20. The rails 34 may be hollow, e.g., defining an internal channel 36. The rails 34 may be rectangular in cross-section. The rails 34 may have any suitable shape, e.g., being "I" or "C" shape in cross-section.

The bumper 24 is attached or integrated to the front of the vehicle 20 to absorb impact energy in a collision. The bumper 24 may be disposed under a front facia of the body 32 of the vehicle 20. The bumper 24 is supported by, e.g., fixed to, the frame 22. For example, the bumper 24 may be supported via the first crush can 26 and the second crush can 28, or any other suitable structure. The bumper 24 is elongated along the lateral axis A2, e.g., extending from the right side of the vehicle 20 to the left side of the vehicle 20. The bumper 24 may be rectangular in cross-section, or any suitable shape. The bumper 24 may be metal or any suitable material.

Figure 2:
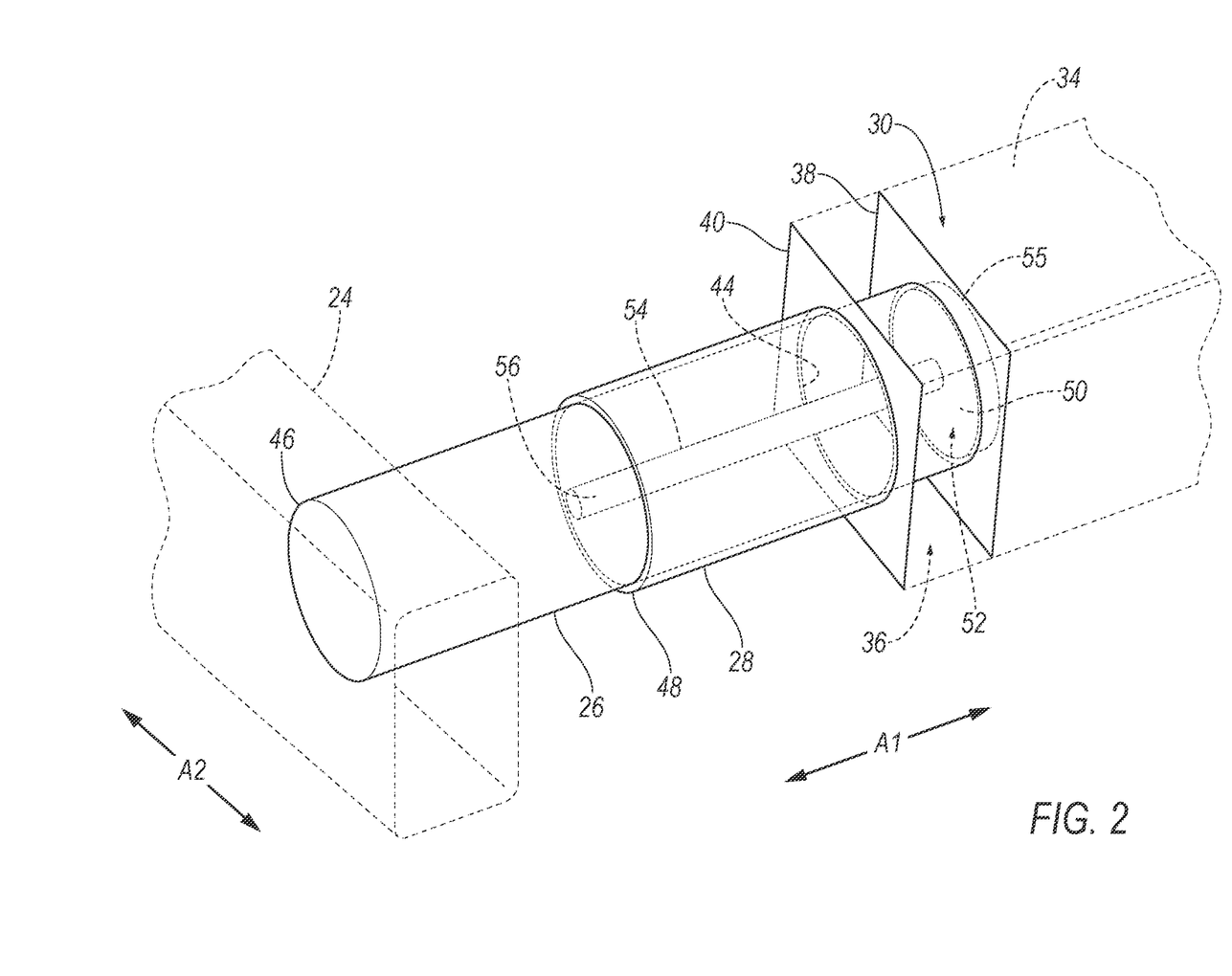
FIG. 2 is a perspective view of the crush cans, a portion of the bumper, and a portion of a frame of the vehicle.

One or more first crush cans 26 and one or more second crush cans 28 are included in the vehicle 20 to absorb energy during certain vehicle impacts. The first crush cans 26 and the second crush cans 28 are between the bumper 24 and the frame 22 along the longitudinal axis A1, e.g., to resist rearward movement of the bumper 24 toward the frame 22. The first crush cans 26 and the second crush cans 28 may be spaced along the lateral axis A2. For example, one first crush can 26 may be disposed at the right side of the vehicle 20 and another first crush can 26 may be disposed at the left side of the vehicle 20. Similarly, one second crush can 28 may be disposed at the right side of the vehicle 20 and another second crush can 28 may be disposed at the left side of the vehicle 20. The vehicle 20 may include additional first crush cans 26 and second crush cans 28. The first crush cans 26 and the second crush cans 28 may be cylindrical or other shape, e.g., rectangular, etc. The first crush cans 26 and the second crush cans 28 may be metal or other suitable material.

Figure 2A:
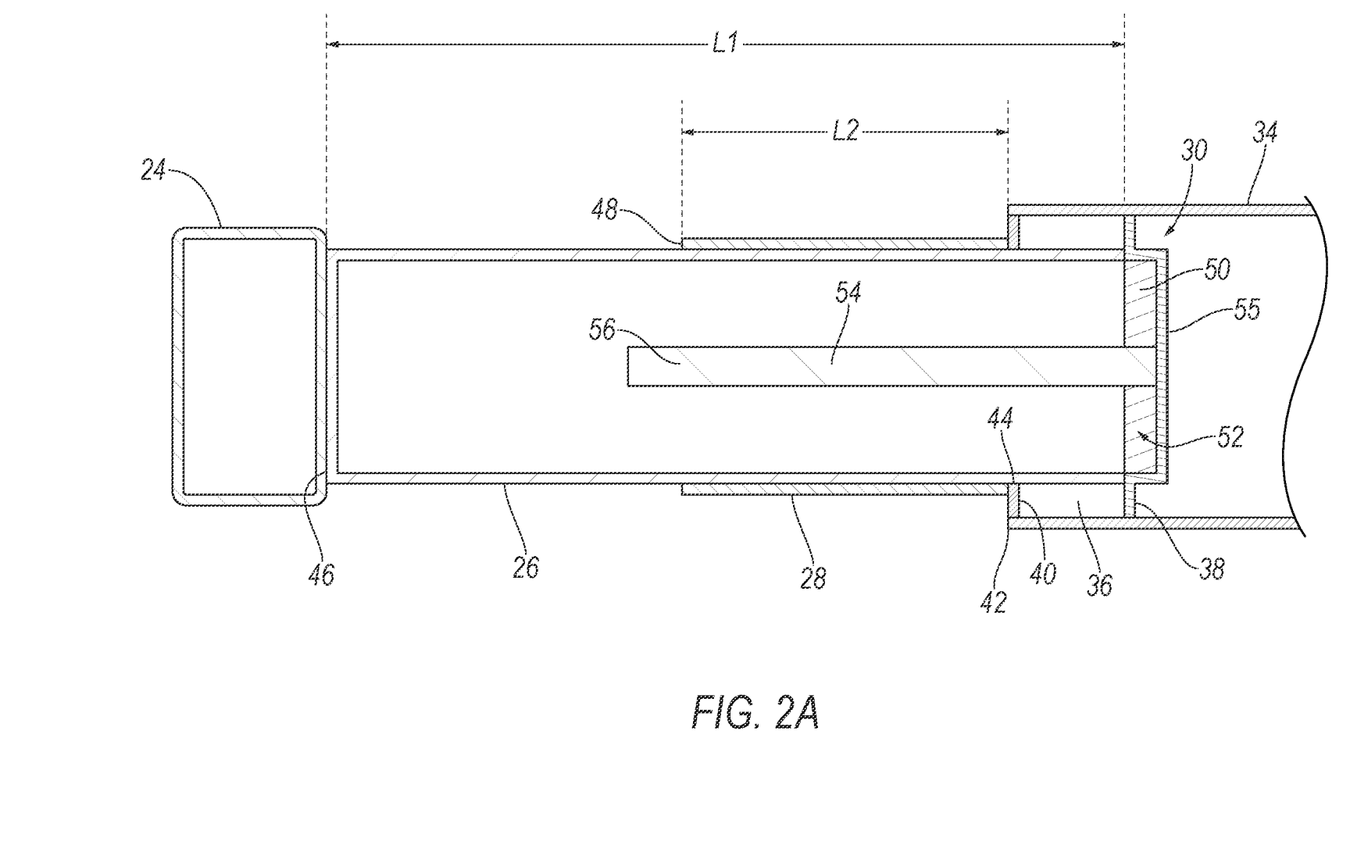
FIG. 2A is a cross-section view of FIG. 2.

The first crush can 26 and the second crush can 28 are attached to the frame 22. The first crush can 26 and the second crush can 28 may be attached to the frame 22 via a first support plate 38 and a second support plate 40. The first crush can 26 may be supported by the first support plate 38. For example, the first crush can 26 may be fixed to the first support plate 38, e.g., via weld or other suitable structure. The first support plate 38 may be within the rail 34, e.g., in the internal channel 36 and surrounded by the rail 34. The first support plate 38 may be fixed to the frame 22, e.g., to the rail 34, via weld or other suitable structure. The second crush can 28 may be supported by the second support plate 40. For example, the second crush can 28 may be fixed to the second support plate 40, e.g., via weld or other suitable structure. The second support plate 40 may be at a distal end 42 of the rail 34, e.g., between the first support plate 38 and the bumper 24 along the longitudinal axis A1. The second support plate 40 may be fixed to the frame 22, e.g., to the rail 34, via weld or other suitable structure. The second support plate 40 defines a hole 44. The hole 44 may be circular, or any suitable shape. Additional or alternately, the first crush can 26 and the second crush can 28 may be attached to the frame 22 via other structure.

The first crush can 26 extends away from the frame 22, e.g., forward from the first support plate 38 along the longitudinal axis A1. The first crush can 26 extends from the first support plate 38 to a first end 46. The first end 46 may be closed. The first crush can 26 may include an electrical conductive material, e.g., at the closed first end 46. The electrically conductive material may be copper or any other material that conducts electricity. The second crush can 28 extends away from the frame 22, e.g., forward from first support plate 38 along the longitudinal axis A1 to a second end 48.

The first crush can 26 has a first length L1 and the second crush can 28 has a second length L2, as shown in FIG. 2A. The second length L2 may be less than the first length L1. In other words, the first crush can 26 may be longer than the second crush can 28. The first crush can 26 may extend beyond the second crush can 28. In other words, the first end 46 may be forward of the second end 48. In other words, the first end 46 may be between the bumper 24 and the second end 48 along the longitudinal axis A1. The first crush can 26 may extend through the hole 44. The hole 44 may be larger than the first crush can 26, i.e., the hole 44 is sized to permit the first crush can 26 to slide therethrough. The first crush can 26 may extend through the second crush can 28. The first crush can 26 may be slidable within the second crush can 28. For example, an inner diameter of the second crush can 28 may be larger than an outer diameter of the first crush can 26. The first crush can 26 may be attached to the bumper 24. For example, the bumper 24 may be fixed to the first end 46 of the first crush can 26, e.g., via weld, fastener, bracket, or other suitable structure.

The first crush can 26 defines a first deformation strength and the second crush can 28 defines a second deformation strength. The first deformation strength and the second deformation strength are resistance strengths of the respective crush cans 26, 28, e.g., indicative of amounts of force necessary to decrease the respective length L1, L2 a certain amount. The first deformation strength and the second deformation strength may be different, for example the first deformation strength may be less than the second deformation strength.

The vehicle 20 includes pyrotechnic devices 30 that are actuatable to detach the first crush cans 26 from the frame 22. In other words, the pyrotechnic devices 30 are configured to detach, e.g., disconnect, the respective first crush can 26 from frame 22 upon actuation. Disconnection of the first crush can 26 from the frame 22 permits translation of the first crush can 26 relative to the frame 22 along the longitudinal axis A1. The pyrotechnic devices 30 may be supported by the frame 22, e.g., one pyrotechnic device 30 may be supported by each of the rails 34. The pyrotechnic devices 30 may be supported by the first support plates 38, e.g., within the internal channels 36. The pyrotechnic devices 30 may each include a charge 50 that, upon actuation, detonates to detach the respective first crush can 26 from the frame 22. Detonation of the charge 50 may, for example, fracture the first crush can 26 and/or the first support plate 38 such that the first crush can 26 is no longer fixed to the first support plate 38 and/or the first support plate 38 is no longer fixed to the rail 34, thereby detaching the first crush can 26. The charge 50 includes, for example, pentaerythritol tetranitrate, cyclotrimethylenetrinitramine, dioctyl sebacate, dioctyl adipate, polyisobutylene, and/or other suitable material that releases sufficient energy upon detonation to detach the first crush can 26 from the frame 22. The charge 50 may supported by the first support plate 38. For example, the first support plate 38 may define a chamber 52. The chamber 52 may be defined by, for example, a cup shaped middle portion 55 the first support plate 38. The cup shaped middle portion 55 may extend rearward away from the bumper 24. The cup shaped middle portion 55 may surround the chamber 52. The charge 50 may be disposed in the chamber 52, e.g., in the cup shaped middle portion 55. Additionally or alternately, the charge 50 may be fixed to the first support plates 38 via fasteners, adhesive, brackets, and/or any other suitable structure.

The vehicle 20 may include a rod 54 extending forward from each of the pyrotechnic devices 30 along the longitudinal axis A1 to a rod end 56. The first crush can 26, the second crush can 28, and the rod 54 may be concentric. For example, a cylindrical cross section of the first crush can 26 may be centered in a cylindrical cross section of the second crush can 28, and the rod 54 may be centered in the cylindrical cross section of first crush can 26. The first crush can 26, the second crush can 28, and the rod 54 may all be elongated along the longitudinal axis A1. The rod 54 may extend from the pyrotechnic device 30 at least as far as the second end 48 of the second crush can 28 along the longitudinal axis A1. The rods 54 may each extend away from the respective pyrotechnic device 30 to the rod end 56. The rod ends 56 ends are distal from the pyrotechnic devices 30. The rod ends 56 may be between the first end 46 of the first crush can 26 and the pyrotechnic device 30 along the longitudinal axis A1. For example, the rod end 56 may be at the second end 48 of the second crush can 28, e.g., along the longitudinal axis A1. As another example, the rod end 56 may be between the first end 46 of the first crush can 26 and the second end 48 of the second crush can 28 along the longitudinal axis A1. The rod 54 may include copper or any suitable material, e.g., that conducts electricity.

Figure 5A:
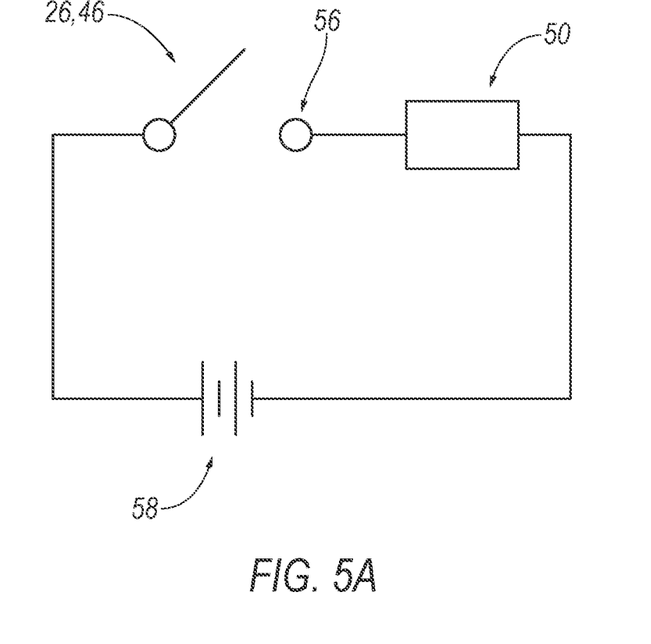
FIG. 5A is a schematic of an electrical circuit formed by components of the vehicle in an open position.

Contact with the rod 54 can cause actuation of the pyrotechnic device 30 and detach the first crush can 26 from the frame 22. The contact that causes actuation may be between the first end 46 of the first crush can 26 and the rod end 56 of the rod 54, between the bumper 24 and the rod end 56 of the rod 54, and/or between the rod 54 and other suitable structure, e.g., to close an electric circuit and cause actuation of the pyrotechnic device 30 to detach the first crush can 26 from the frame 22. For example, and with reference to FIGS. 5A and 5B, an electrical power source 58, such as a battery, may be electrically connected to the rod 54 and to the first crush can 26, the bumper 24, or other suitable structure that is moved rearward during certain impacts to the vehicle 20. The rod 54 and the first crush can 26, the bumper 24, or other suitable structure, may provide a switch that is in an open position under normal operation of the vehicle 20.

Figure 3:
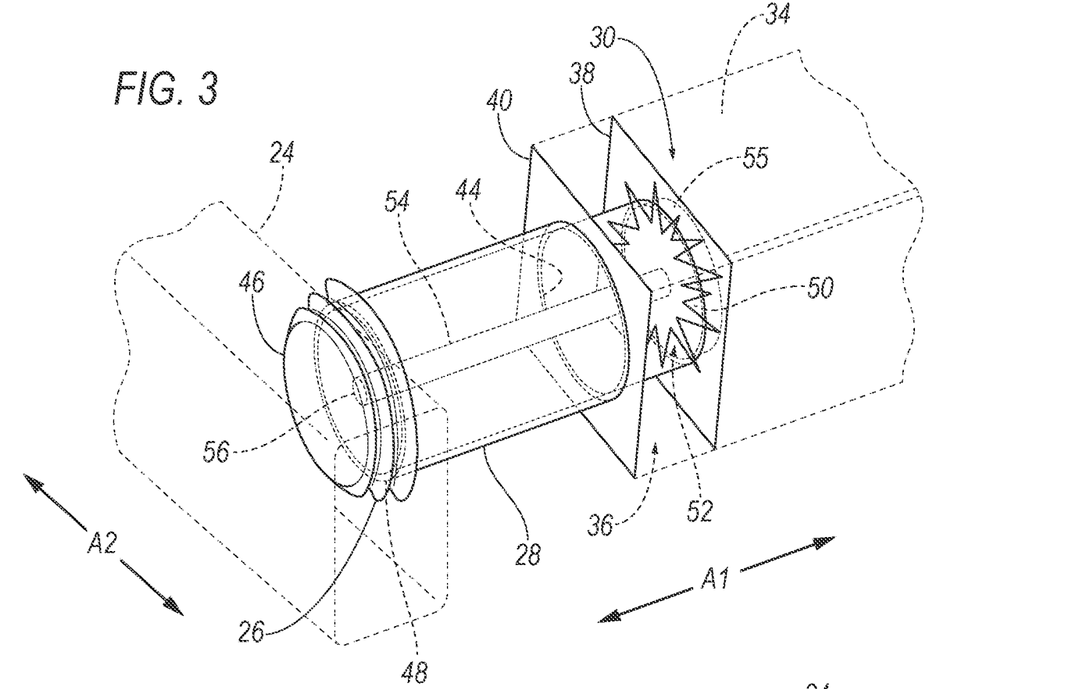
FIG. 3 is a perspective view of the crush cans, the portion of the bumper, and the portion of the frame of the vehicle with the first crush can deformed and being detached from the frame.
Figure 3A:
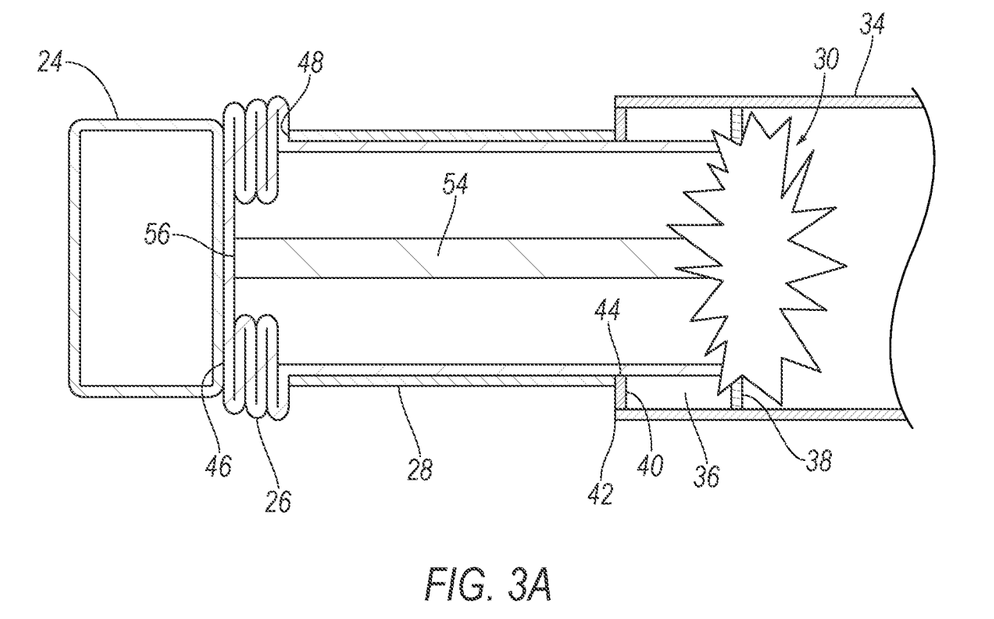
FIG. 3A is a cross-section view of FIG. 3.
Figure 4:
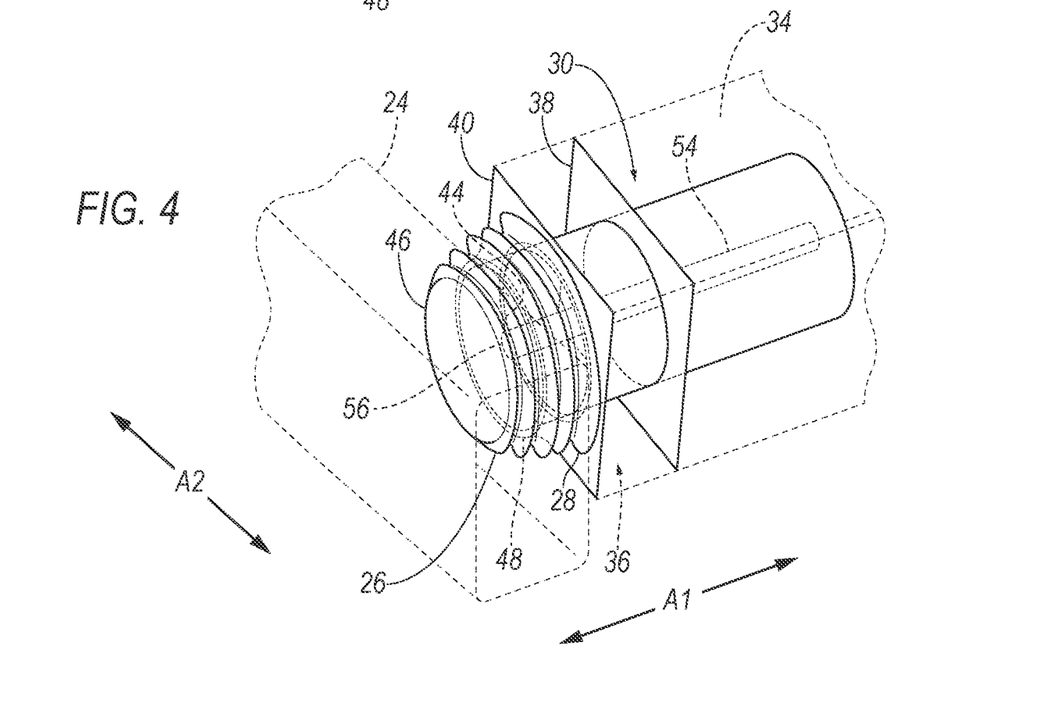
FIG. 4 is a perspective view of the crush cans, the portion of the bumper, and the portion of the frame of the vehicle with the second crush can deformed and that the first crush can detached from the frame.
Figure 4A:
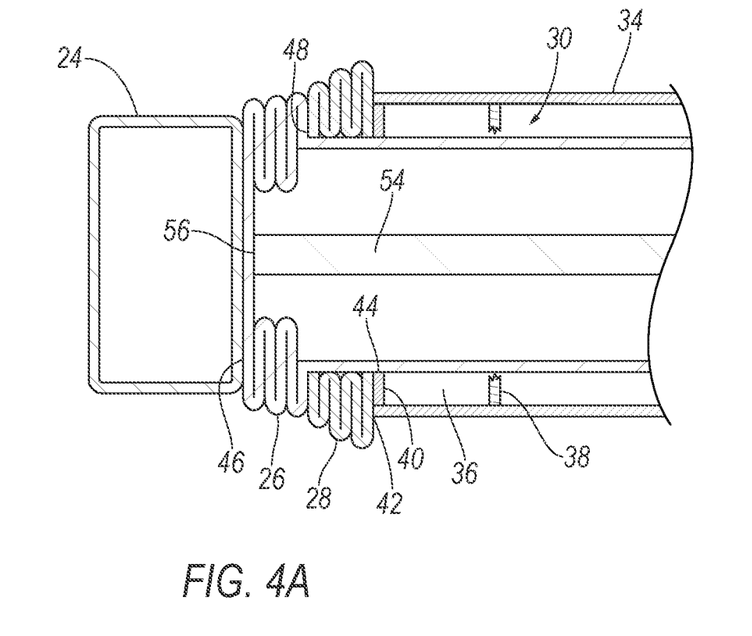
FIG. 4A is a cross-section view of FIG. 4.
Figure 5B:
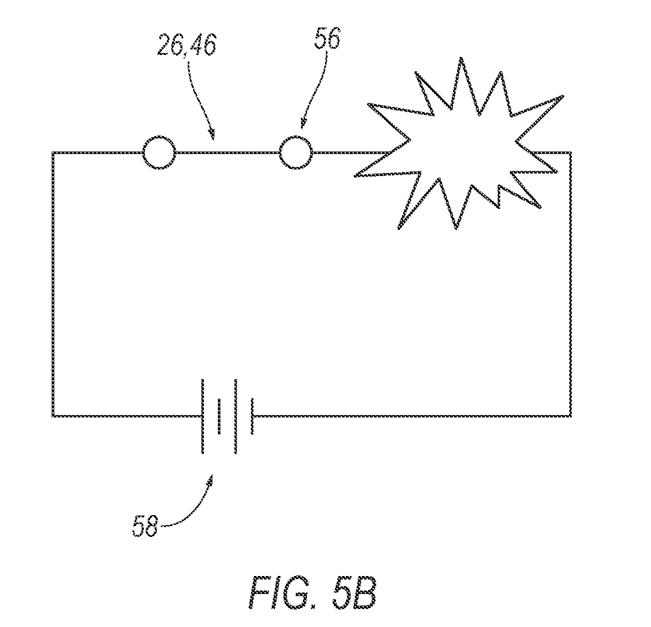
FIG. 5B is a schematic of the electrical circuit of FIG. 5 in a closed position.

With respect to FIGS. 3 and 3A, certain impacts to the bumper 24 of the vehicle 20 may urge the bumper 24 rearward toward the frame 22 and cause deformation of the first crush can 26. The deformation of the first crush can 26 may resist such movement at the first deformation strength. The rearward movement of the bumper 24 may bring the first crush can 26, the bumper 24, or other suitable structure electrically connected to the electrical power source 58 into contact with the rod 54. The connection may close the circuit, as shown in FIG. 5B, and an electrical pulse from the battery may travel to the pyrotechnic device 30, e.g., detonating the charge 50 and detaching the first crush can 26 from the frame 22. After the first crush can 26 is detached it may slide rearward in the second crush can 28 and no longer resist rearward movement of the bumper 24. Next, continued rearward movement of the bumper 24 may cause deformation of the second crush can 28, as shown in FIG. 4A. The deformation of the second crush can 28 may resist rearward movement of the bumper 24 at the second deformation strength.

The adjectives "first" and "second" are used throughout this document as identifiers and do not signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
   a frame;
   a bumper;
   a first crush can attached to the frame, the first crush can between the frame and the bumper, the first crush can having a first length;
   a second crush can attached to the frame, the second crush can between the frame and the bumper, the second crush can having a second length less than the first length; and
   a pyrotechnic device supported by the frame, the pyrotechnic device actuatable to detach the first crush can from the frame.

2. The vehicle of claim 1, wherein the first crush can is slidable within the second crush can.

3. The vehicle of claim 1, further comprising a rod extending forward from the pyrotechnic device, and wherein contact with the rod causes actuation of the pyrotechnic device and detaches the first crush can from the frame.

4. The vehicle of claim 3, wherein the first crush can extends away from the frame to a first end, the second crush can extends away from the frame to a second end, and the rod extends away from the pyrotechnic device to a rod end, the rod end between the first end and the pyrotechnic device.

5. The vehicle of claim 4, wherein contact between the first end of the first crush can and the rod end of the rod causes actuation of the pyrotechnic device to detach the first crush can from the frame.

6. The vehicle of claim 5, wherein the first crush can, the second crush can, and the rod are concentric.

7. The vehicle of claim 3, wherein the rod extends from the pyrotechnic device at least as far as the second end of the second crush can.

8. The vehicle of claim 3, wherein contact between the first crush can and the rod closes an electric circuit and causes actuation of the pyrotechnic device to detach the first crush can from the frame.

9. The vehicle of claim 1, wherein the frame includes a rail, and further comprising a first support plate within the rail, the first crush can supported by the first support plate.

10. The vehicle of claim 9, further comprising a second support plate at an end of the rail, the second crush can supported by the second support plate.

11. The vehicle of claim 10, wherein the second support plate defines a hole and the first crush can extends through the hole.

12. The vehicle of claim 9, wherein the pyrotechnic device includes a charge supported by the first support plate, the charge actuatable to fracture the first support plate and detach the first crush can.

13. The vehicle of claim 12, wherein the first support plate defines a chamber, the charge being in the chamber.

14. The vehicle of claim 1, wherein the pyrotechnic device includes a charge actuatable to detach the first crush can.

15. The vehicle of claim 1, wherein the first crush can defines a first deformation strength, and the second crush can defines a second deformation strength that is different than the first deformation strength.

16. The vehicle of claim 1, wherein the first crush can is attached to the bumper.

17. The vehicle of claim 1, further comprising a body, the frame and the body having a unibody construction.

18. The vehicle of claim 1, further comprising a body, the body supported by the frame.

* * * * *